United States Patent [19]

Leger

[11] Patent Number: 5,762,486

[45] Date of Patent: Jun. 9, 1998

[54] TOROIDAL VORTEX COMBUSTION FOR LOW HEATING VALUE LIQUID

[75] Inventor: Christopher Brian Leger, White Plains, N.Y.

[73] Assignee: Praxair Technology, Inc., Danbury, Conn.

[21] Appl. No.: 604,533

[22] Filed: Feb. 21, 1996

[51] Int. Cl.[6] ............................................. F23C 5/00
[52] U.S. Cl. .................. 431/8; 431/5; 431/9; 431/10; 431/11; 110/346; 110/238
[58] Field of Search ........................... 431/5, 8, 9, 10, 431/11, 187, 190, 215; 110/346, 238

[56] References Cited

U.S. PATENT DOCUMENTS

| | | | |
|---|---|---|---|
| 4,023,921 | 5/1977 | Anson | 431/9 |
| 4,541,796 | 9/1985 | Anderson | 431/187 |
| 4,604,988 | 8/1986 | Rao | 431/4 |
| 4,702,073 | 10/1987 | Melconian | 60/39.464 |
| 4,738,614 | 4/1988 | Snyder et al. | 431/8 |
| 4,861,262 | 8/1989 | Gitman et al. | 431/5 |
| 4,878,829 | 11/1989 | Anderson | 431/8 |
| 4,907,961 | 3/1990 | Anderson | |
| 5,000,102 | 3/1991 | Ho | 110/346 |
| 5,129,335 | 7/1992 | Lauwers | 110/346 |

Primary Examiner—Larry Jones
Attorney, Agent, or Firm—Stanley Ktorides

[57] ABSTRACT

A method for combusting low heating value liquid by forming a toroidal vortex between atomized liquid and medium velocity oxidant, and carrying out combustion within the toroidal vortex to serve as a dependable ignition source for the main combustion reaction.

5 Claims, 1 Drawing Sheet

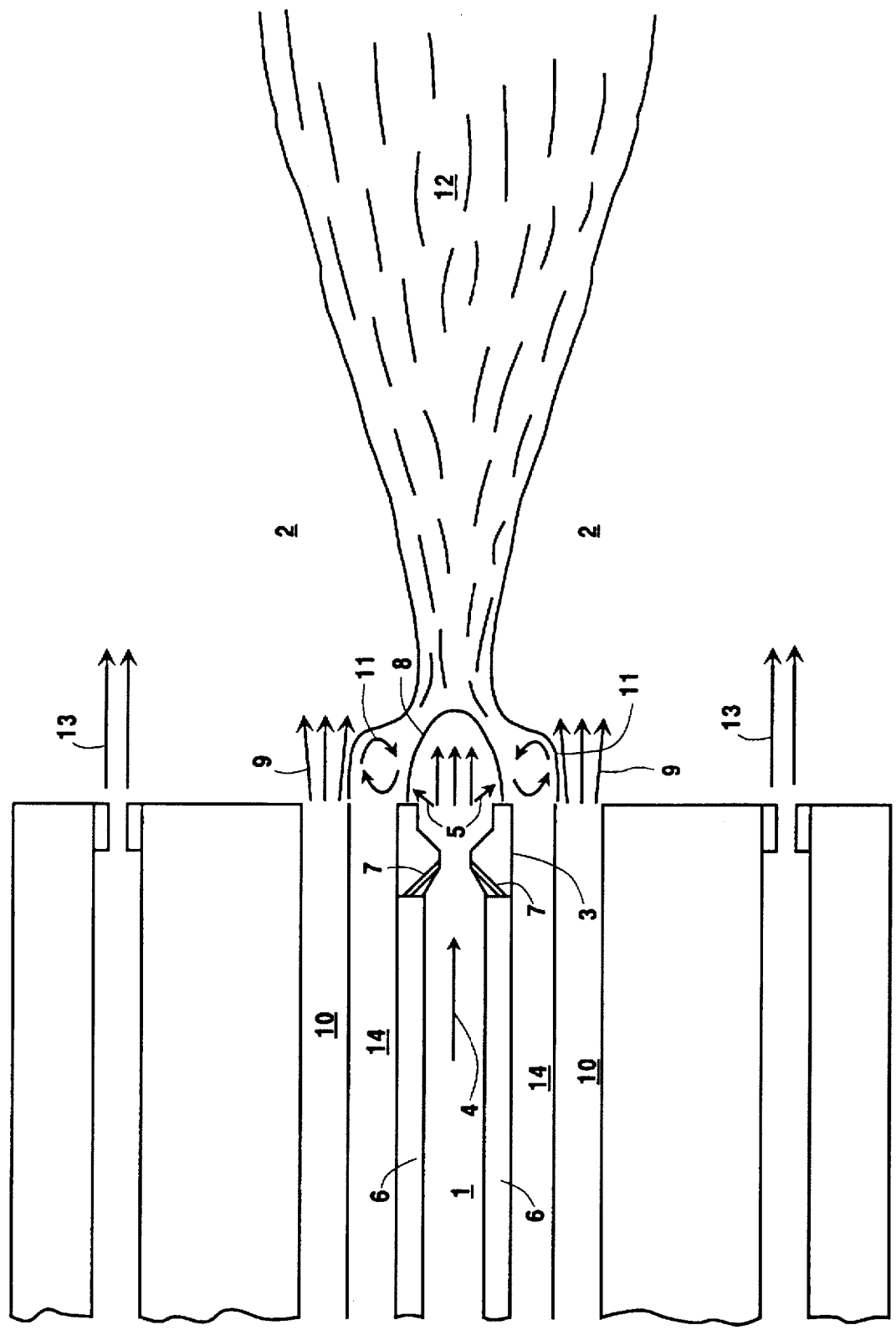

TOROIDAL VORTEX COMBUSTION FOR LOW HEATING VALUE LIQUID

TECHNICAL FIELD

This invention relates generally to combustion and more specifically to combustion of low heating value liquid.

BACKGROUND ART

Low heating value liquid such as liquid wastes or waste fuels is difficult to combust in a stable manner because of the presence of a large amount of non-combustible material, such as water. The non-combustible material provides a heat sink which prevents the combustible components of the liquid from reaching their volatilization and ignition temperatures quickly. This results in an increased heating requirement in the preheating/volatilization stage followed by lower heat release in the combustion stage, and it is difficult to use the heat from the combustion stage to sustain the heating requirement in the preheating/volatilization stage. With conventional fuels the two stages are close enough together that sufficient heat from the combustion stage is transferred to the preheating/volatilization stage. Heretofore, such low heating value liquid has been combusted by generating a very high temperature flame and injecting the low heating value liquid into this very high temperature flame. While this method is effective, it is also costly because of the need to generate the very high temperature flame using high heating value fuels, and it can lead to high $NO_x$ generation and overheating problems. However, without such flame the combustion of the low heating value liquid would be unstable and incomplete.

Accordingly it is an object of this invention to provide a method for combusting low heating value liquid which can be carried out in a stable manner without need for an intense high temperature flame into which the liquid is injected and eliminating or minimizing the need for an auxiliary high heating value fuel.

SUMMARY OF THE INVENTION

The above and other objects which will become apparent to one skilled in the art upon a reading of this disclosure are attained by the present invention which is:

A method for combusting low heating value liquid comprising:

(A) passing, in a stream having an axial direction, low heating value liquid, having a heating value less than 10,000 BTU/lb., into a combustion zone through a nozzle with at least some of the fluid being passed into the combustion zone at an angle greater than 35 degrees from said axial direction;

(B) passing medium velocity oxidant into the combustion zone spaced from the low heating value liquid stream at a velocity within a range of from 100 to 300 feet per second, and creating a toroidal vortex within the combustion zone between the low heating value liquid stream and the medium velocity oxidant;

(C) passing low heating value liquid and medium velocity oxidant into the toroidal vortex; and (D) carrying out combustion within the toroidal vortex.

As used herein the term "heating value" means the total heat obtained from a specified amount of fluid and its stoichiometrically correct amount of oxidant, both being at 60° F. when combustion starts and the combustion products being cooled to 60° F. before the heat release is measured.

As used herein the term "low heating value liquid" means a liquid having a heating value less than 10,000 BTU/lb. Such liquid may be composed of a mixture of different liquid streams and may contain particles of solid materials in suspension.

As used herein the term "high heating value liquid" means a liquid having a heating value equal to or greater than 10,000 BTU/lb. As used herein the term "high heating value gaseous fuel" means a gaseous fuel having a heating value equal to or greater than 10,000 BTU/lb.

As used herein the term "atomizing fluid" means a gaseous stream that provides some or all of the energy to atomize a liquid stream into small droplets.

As used herein the term "toroidal vortex" means a flow pattern in which flow streamlines form closed circles about a line called the center of circulation, with this line being curved back upon itself to form a circle. An example of a toroidal vortex is a smoke ring.

BRIEF DESCRIPTION OF THE DRAWING

The sole FIGURE is a cross-sectional representation of an apparatus which may be used to practice the toroidal vortex combustion method of this invention.

DETAILED DESCRIPTION OF THE INVENTION

The invention will be described in detail with reference to the drawing. Referring now to the FIGURE there is shown central tube 1 through which is passed a stream of low heating value liquid in an axial direction identified by the arrow 4 within tube 1. Any suitable low heating value liquid which may be used in the practice of this invention. By their nature low heating value waste liquids have an unknown or highly variable composition. A low heating value waste liquid can be composed of virtually any liquid or solid materials in a mixture with other materials in such proportions that the mixture has a heating value less than 10,000 BTU/lb. Frequently such liquids comprise solutions or mixtures of other materials with water.

The low heating value liquid is passed from tube 1 into combustion zone 2 through nozzle 3. At least some of the low heating value liquid is passed into combustion zone 2 through nozzle 3 at an angle greater than 35 degrees, preferably greater than 45 degrees, from axial direction 4. Such wide angle injection is illustrated by arrows 5 in the FIGURE.

preferably nozzle 3 is an atomizing nozzle such as that disclosed and claimed in U.S. Pat. No. 4,738,614—Snyder et al. When such an atomizing nozzle is employed in the practice of the invention, atomizing fluid, such air, oxygen or steam, may be provided to nozzle 3 through annular duct 6 and into contact with the low heating value liquid through atomizing fluid passage 7.

Medium velocity oxidant, at a velocity within a range of from 100 to 300 feet per second (fps), preferably within the range of from 100 fps to 200 fps, is provided into combustion zone 2 spaced from the atomized low heating value liquid stream 8. In the embodiment illustrated in the FIGURE, medium velocity oxidant 9 is provided into combustion zone 2 through passageway 10 which is axially concentric with central tube 1 so that medium velocity oxidant 9 forms a stream spaced from and annular to atomized low heating value liquid stream 8. Medium velocity oxidant is preferably a fluid having an oxygen concentration of at least 50 mole percent. A particularly preferred fluid for use as the medium velocity oxidant of this invention is a fluid having an oxygen concentration of at least 85 mole percent.

The medium velocity of stream 9 coupled with the spacing of stream 9 from stream 8 within combustion zone 2 causes the formation of stabilized toroidal vortex 11 within combustion zone 2 between the low heating value liquid 8 and the medium velocity oxidant 9. The medium velocity oxidant in stream 9 creates a suction as it issues from annular passage 10. Fluid is, drawn by this suction into the stream where it becomes entrained. As stream 9 is annular in shape, it expands toward the centerline of the annulus as the stream entrains other fluids and as it decelerates. The decelerating mixture at the limit of the medium velocity oxidant stream 9 closest to the centerline is acted upon by the suction at the base of the stream, causing it to curve back toward the burner and become entrained in this stream. The velocity of stream 9 must be sufficiently high to create a strong enough suction to complete the toroidal vortex. However, the velocity of stream 9 is not so high that the flame blows off. Preferably the velocity of the atomized liquid stream 8 is not significantly higher than the velocity of stream 9. A high relative velocity for stream 8 will cause it to escape entrainment into the vortex. Some oxidant from medium velocity oxidant 9 and some low heating value liquid from stream 8 are passed into toroidal vortex 11 wherein they are combusted. The wide angle injection 5 of the low heating value liquid into combustion zone 2 ensures that sufficient combustibles are provided into the toroidal vortex to sustain combustion within the vortex. Moreover the vortex action within toroidal vortex 11 serves to concentrate the combustibles and the oxygen provided therein by the low heating value liquid and the medium velocity oxidant thus further serving to create sustained and stabilized combustion within the toroidal vortex. The presence of sustained combustion in the toroidal vortex provides the heat necessary to vaporize the low heating value liquid which it entrains. In addition, the sustained combustion within toroidal vortex 11, in turn, serves as a constant ignition source for the combustion of low heating value liquid with remaining medium velocity oxidant in downstream flame envelope 12 within combustion zone 2. This serves to completely combust the combustibles within the low heating value liquid in an efficient and stable manner.

In a preferred embodiment of the invention there is provided into combustion zone 2 spaced from the medium velocity oxidant one or more streams of high velocity oxidant 13 at a velocity greater than 450 fps, preferably greater than 800 fps. The high velocity oxidant is preferably a fluid having an oxygen concentration of at least 25 mole percent. A particularly preferred fluid for use as the high velocity oxidant in this preferred embodiment of the invention is technically pure oxygen having an oxygen concentration of at least 99.5 mole percent. The high velocity oxidant serves to create turbulence and recirculation within the combustion zone leading to improved mixing and thus further ensuring the complete combustion of the low heating value liquid.

In another preferred embodiment of the invention, high heating value gaseous fuel is provided directly into the toroidal vortex such as through annular passageway 14. In this way the combustion within the toroidal vortex is more effectively sustained, especially when the low heating value liquid is particularly dilute in combustibles. The preferred high heating value gaseous fuel for use in this preferred embodiment of the invention is natural gas. Among other higher heating value gaseous fuels which may be used in this embodiment of the invention one can name propane, butane, methane, process fuel gas, carbon monoxide, hydrogen and mixtures thereof. In some cases it may also be desirable to mix high heating value liquid fuels such as fuel oil into the low heating value liquid before it is sent through the burner, in order to minimize or eliminate the need for gaseous fuels to support stable combustion.

Now, by the practice of this invention, one can combust low heating value liquid completely and efficiently in a stable manner without need for generating an intense very high temperature flame.

Although the invention has been described in detail with reference to certain preferred embodiments, those skilled in the art will recognize that there are other embodiments of the invention within the spirit and the scope of the claims.

I claim:

1. A method for combusting low heating value liquid comprising:

(A) passing, in a stream having an axial direction, low heating value liquid, having a heating value less than 10,000 BTU/lb., into a combustion zone through a nozzle with at least some of the liquid being passed into the combustion zone at an angle greater than 35 degrees from said axial direction;

(B) passing medium velocity oxidant into the combustion zone spaced from the low heating value fluid stream at a velocity within a range of from 100 to 300 feet per second, and creating a toroidal vortex within the combustion zone between the low heating value liquid stream and the medium velocity oxidant;

(C) passing low heating value liquid and medium velocity oxidant into the toroidal vortex; and (D) carrying out combustion within the toroidal vortex.

2. The method of claim 1 further comprising combusting low heating value liquid and medium velocity oxidant within the combustion zone downstream of the toroidal vortex.

3. The method of claim 1 further comprising injecting high velocity oxidant into the combustion zone spaced from the medium velocity oxidant at a velocity greater than 450 feet per second.

4. The method of claim 1 further comprising providing gaseous fuel into the toroidal vortex.

5. The method of claim 1 wherein the low heating value liquid is passed into the combustion zone in an atomized stream.

\* \* \* \* \*